United States Patent
Yang et al.

(10) Patent No.: US 7,444,477 B2
(45) Date of Patent: *Oct. 28, 2008

(54) SYSTEM AND METHOD FOR EFFICIENTLY PERFORMING MEMORY INTENSIVE COMPUTATIONS INCLUDING A BIDIRECTIONAL SYNCHRONIZATION MECHANISM FOR MAINTAINING CONSISTENCY OF DATA

(75) Inventors: Jin Yang, Castro Valley, CA (US); Rao Korupolu, Fremont, CA (US); Jinlin Wang, Mountain View, CA (US); Harry Philip Walton, III, San Ramon, CA (US); Bor-Ruey Fu, Dublin, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/679,040

(22) Filed: Feb. 26, 2007

(65) Prior Publication Data
US 2007/0143254 A1    Jun. 21, 2007

Related U.S. Application Data

(63) Continuation of application No. 10/041,033, filed on Dec. 28, 2001, now Pat. No. 7,200,720.

(51) Int. Cl.
G06F 12/00    (2006.01)
G06F 17/30    (2006.01)

(52) U.S. Cl. .................. 711/141; 711/100; 711/147; 711/154

(58) Field of Classification Search .......... 711/141, 711/147, 100, 154; 707/201, 1, 8, 200, 203
See application file for complete search history.

Primary Examiner—Tuan V. Thai
(74) Attorney, Agent, or Firm—Townsend and Townsend and Crew LLP

(57) ABSTRACT

A system and method for efficiently performing memory intensive computations including a bidirectional synchronization mechanism for maintaining consistency of data on which computations will be performed. This can be used to solve various problems such as those in a business context. Synchronization occurs in a near-real-time fashion between data in a database and data stored in memory. The synchronization is accomplished by periodically scanning the database to see if any data has changed. If any data has changed, the changes are copied over to memory so that the data in memory is current. This update is accomplished without copying the entire database into memory each time data in the database changes.

20 Claims, 5 Drawing Sheets

SYSTEM AND METHOD FOR EFFICIENTLY PERFORMING MEMORY INTENSIVE COMPUTATIONS INCLUDING A BIDIRECTIONAL SYNCHRONIZATION MECHANISM FOR MAINTAINING CONSISTENCY OF DATA

CROSS-REFERENCES TO RELATED APPLICATIONS

This application is a continuation of, and claims priority to, U.S. Patent application Ser. No. 10/041,033, filed Dec. 28, 2001, and entitled "SYSTEM AND METHOD FOR EFFICIENTLY PERFORMING MEMORY INTENSIVE COMPUTATIONS INCLUDING A BIDIRECTIONAL SYNCHRONIZATION MECHANISM FOR MAINTAINING CONSISTENCY OF DATA," which is hereby incorporated herein by reference.

BACKGROUND OF THE INVENTION

1. Field of the Invention

The present invention relates generally to the field of computer software, and more particularly to a system and method for efficiently performing memory intensive computations including a bidirectional synchronization mechanism for maintaining consistency of data.

2. Background of the Invention

The intensive computations required in certain application software necessitate access to and manipulation of a substantial amount of data simultaneously. If all of the data is not resident in memory, computation speed will be significantly slowed down. In addition, the required data is typically closely tied to transactional data stored in a database. The data in the database might be changing frequently due to, for example, real world transactions. The disparity between the two data sets causes inaccuracies in the results of the computations.

These problems are encountered in many business applications. For example, supply chain planning exhibits such problems. Supply chain planning requires a large amount of information to build an enterprise plan. This information typically includes data related to production capacity, inventory balance, distribution network, bill of material (BOM), sourcing of components, etc. In order to build a good enterprise plan, a computation intensive mathematical algorithm should have instant access to this data in order to be able to run efficiently.

This information (such as inventory balance, etc.) is typically stored in a database. As mentioned herein, problems arise when live business transactions are performed against the database, thus causing data in the database to change at the same time as a mathematical algorithm is being run on the data. At least two prior art attempts were made with respect to trying to overcome the problem of the continuous change of data in the database.

Referring to FIG. 1, a first approach was to extract the required transactional data from a database 100 and store the data in a flat file 102. Computation software 104 would then read file 102 and process the data through the appropriate mathematical algorithm. The output from this computation would be written to another file 106 and exported to, or merged with, database 100.

Referring to FIG. 2, a second approach was to extract and transfer a snapshot of the required transactional data from a database 200 to a dedicated database 202. Computation software 204 would read the data directly from dedicated database 202 and process the data through the appropriate mathematical algorithm. The output from this computation would be written to dedicated database 202 and transferred to, or merged with, database 200. In this scenario, all business transactions are processed through database 200 but not through dedicated database 202. Dedicated database 202 acts as a medium to mitigate the constant changing nature of the data in database 200 while providing a stable view of the data to the computation algorithm.

There are various drawbacks to these prior art approaches. These approaches cannot handle incremental changes to the data in database 100 and database 200 efficiently. Both approaches require a full reload of the entire data set to accommodate situations where even only a small portion of the data in database 100 or database 200 has been changed. It has heretofore not been possible to build a computationally intensive application that simultaneously supports high frequency interactions, from a user or otherwise, and access to the most current changes to information.

SUMMARY OF THE INVENTION

The present invention provides in various embodiments a system and method for efficiently performing memory intensive computations including a bidirectional synchronization mechanism for maintaining consistency of data.

In a system according to one embodiment of the present invention, the system facilitates efficiently performing memory intensive applications. The system comprises a data cache coupled to a first set of data and a second set of data and configured to perform a scan operation on at least a portion of the first set of data and an update operation on the second set of data with changes that have occurred in the first set of data; an engine manager coupled to the data cache and configured to instruct the data cache to perform the scan and update operations; and a solver coupled to the data cache and configured to perform computations on the second set of data.

In a method according to another embodiment of the present invention, the method facilitates efficiently performing memory intensive computations. The method comprises performing, using a data cache, a scan operation on at least a portion of a first set of data; performing, using the data cache, an update operation on a second set of data with changes that have occurred in the first set of data; and performing computations, using a solver, on the second set of data.

A further understanding of the nature and advantages of the inventions herein may be realized by reference to the remaining portions of the specification and the attached drawings.

DESCRIPTION OF THE SPECIFIC EMBODIMENTS

Figure 1:
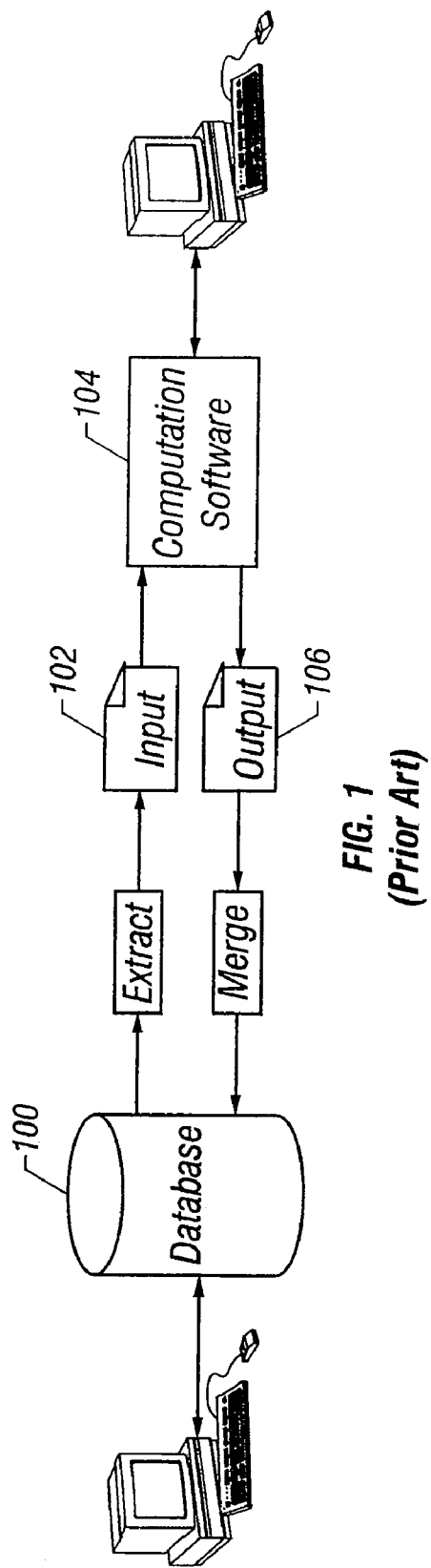
FIG. 1 is a schematic diagram of a prior art attempt at manipulating data with the use of intermediary files.
Figure 2:
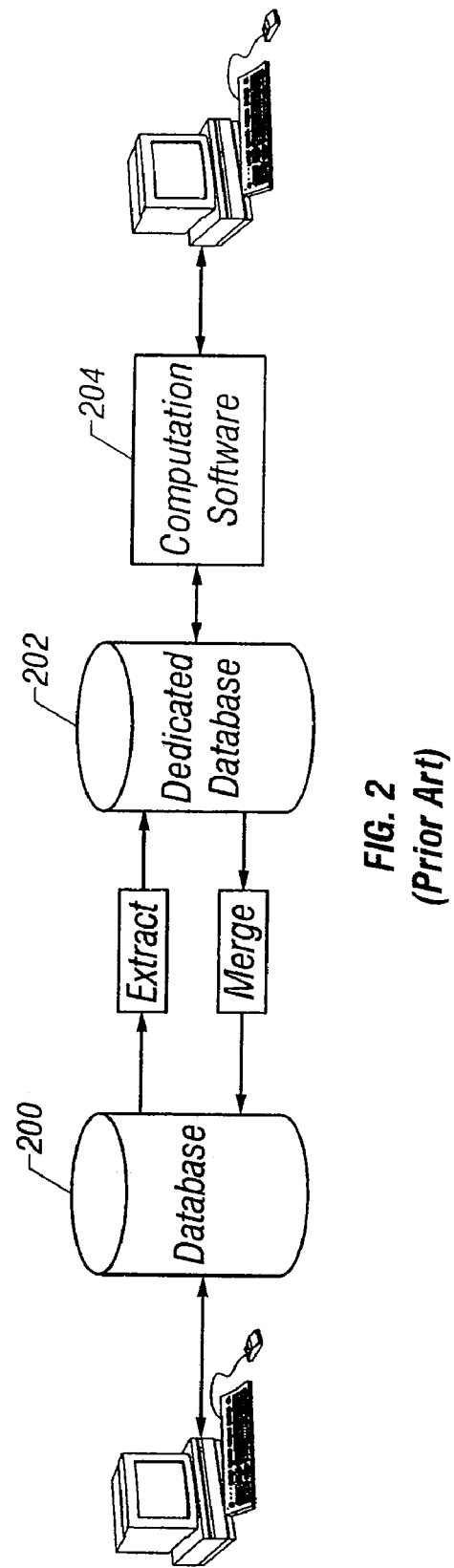
FIG. 2 is a schematic diagram of a prior art attempt at manipulating data with the use of an intermediary database.

As shown in the exemplary drawings wherein like reference numerals indicate like or corresponding elements among the figures, an embodiment of a system according to the present invention will now be described in detail. The following description sets forth an example of a system and method for efficiently performing memory intensive computations including a bidirectional synchronization mechanism for maintaining consistency of data.

As mentioned previously, the computationally intensive processing necessitated by some modern application software requires immediate access to a substantial amount of data simultaneously. Having this data available only in a database would slow run time down enormously. Therefore, the present system allows this data to be resident in memory to facilitate efficient processing thereof. In particular, a user may have a particular overall problem (overall problem instance) in mind that he or she wants to solve. This overall problem can be modeled mathematically. Taking the business problem of supply chain planning, for example, the user may want to know the answers to various questions related to when, where, why, how, how much, and the like, in the context of questions related to materials, vendors, manufacturing, supply, etc. For example, one of the many questions a user typically wants answered relates to what vendors should be used for various materials and parts. The user might also want to know what facilities to use to manufacture various parts of a product.

The answers to these and other questions depend on a multitude of variables. One example is the costs charged by the various vendors and the corresponding expected supply times. Another example is whether cost or service quality is of higher priority to the user. In one example, sales growth in a given year may increase from 10 percent to 15 percent. The user may want to know how this change in sales growth affects production capacity and manufacturing specifics.

Furthermore, the data within the database may be frequently changing. Consequently, the present system synchronizes in a near-real-time fashion the data in the database with the data stored in memory. Prior attempts in the art, described herein, involved copying over the entire database into memory if even only a small amount of data in the database had changed. Obviously, this could be extremely time consuming. Therefore, the present system implements in-memory storage and processing of the data. This implementation is referred to herein as an in-memory computation system. A mechanism is provided to bring changes to the data in the database by, say, business transactions, into the in-memory computation system. This is much more efficient than copying over the entire set of data in the database into memory every time there is a small change in the data in the database. It should be noted that the present system is not limited to use as a business application.

Figure 3:
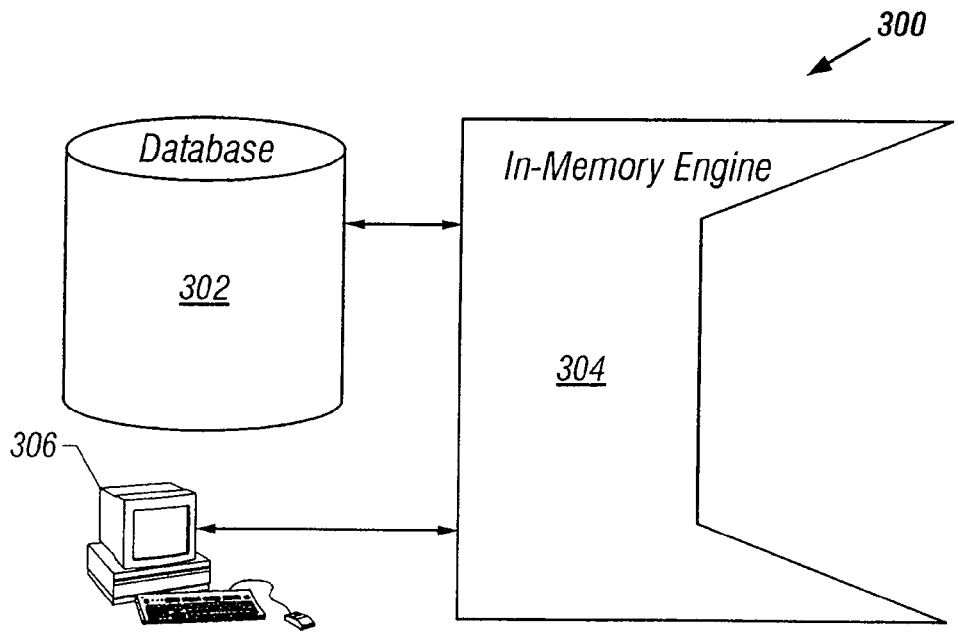
FIG. 3 is a schematic diagram of a system according to one embodiment of the present invention.

Referring now to FIG. 3, a system 300 according to embodiments of the present invention is depicted. System 300 comprises a data storage means, such as database 302, an in-memory engine 304, and a client computer system 306. In-memory engine 304 is capable of receiving a plug-in, as will be discussed further herein. In-memory engine 304 and the plug-in co-reside on the same computer system, such as computer system 306, in one embodiment. Database 302 comprises a first set of data. The first set of data may be related to transactional and other data related to running a business and needed for running a related business application, e.g., orders, inventory, costs of parts, etc. Database 302 and in-memory engine 304 may reside on different computer systems, in one embodiment.

In-memory engine 304 is coupled to database 302 in a bidirectional fashion. It is contemplated that in-memory engine 304 can reside in computer system 306 or some other system or medium. In-memory engine 304 comprises a second set of data, which is updated as needed with changes that have been made to the first set of data. The second set of data is the data on which the desired memory intensive computations will be run.

Figure 4:
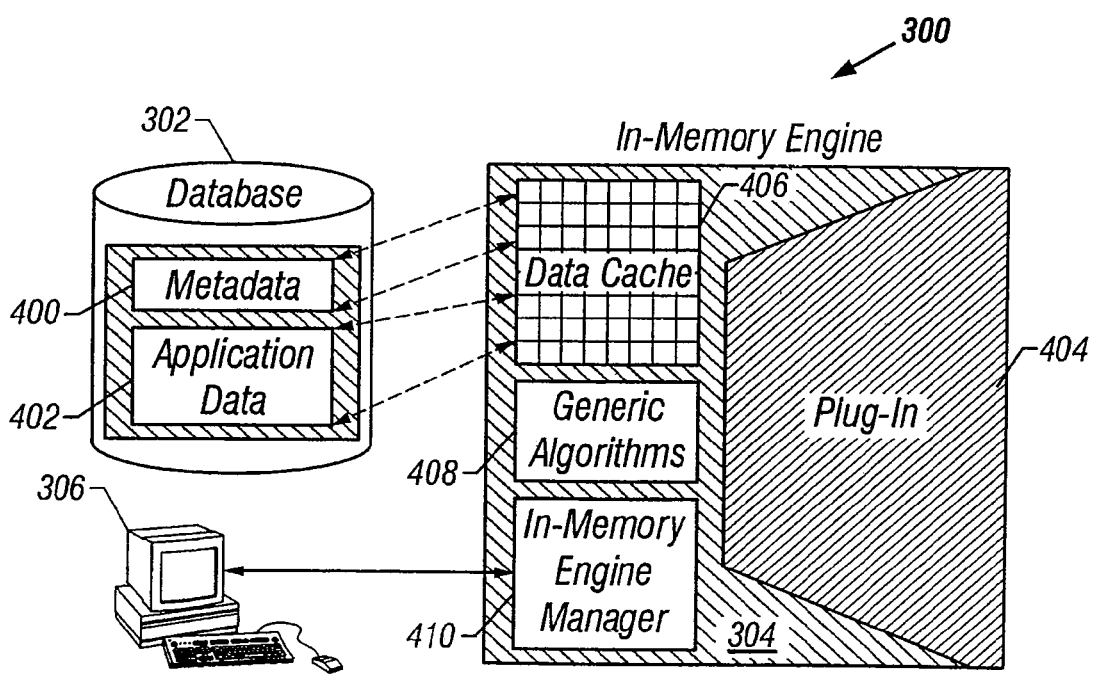
FIG. 4 is the schematic diagram of FIG. 3 in greater detail.

Referring to FIG. 4, FIG. 3 is shown in greater detail. Database 302 comprises both metadata 400 and application data 402. Together, metadata 400 and application data 402 comprise the first set of data. In another embodiment, application data 402 alone comprises the first set of data.

Metadata 400 is definitional data that provides information about application data 402 and how the application data will be managed within system 300. Metadata 400 describes the structure of application data 402 in database 302 and how the application data is to be synchronized with the second set of data, i.e., the in-memory data. Metadata 400 is typically embodied in the form of tables. Metadata 400 can contain information related to what information was updated and when. For example, a flag may be used within a table of metadata 400 that indicates that row seven was last updated on Mar. 3, 2001, at 2:38:04 P.M.

Conversely, application data 402 comprises conventional database tables that store the data of database 302. An example of application data 402 is the number of a certain item currently available in inventory.

In keeping with some embodiments according to the present invention, in-memory engine 304 interfaces with plug-in 404. Together, in-memory engine 304 and plug-in 404 comprise an in-memory computation system. Plug-in 404 comprises application specific software. Plug-in 404 can be changed to suit various specific applications without modifying the rest of system 300. Plug-in 404 contains the application specific knowledge and business logic to interpret the physical meaning of the in-memory data.

Plug-in 404 plus the related content in metadata 400, in one embodiment, is the application specific part of the application software. The application specific part of the application software, plug-in 404 plus the related metadata 400, is conveniently separate from the rest of the application software. Therefore, whenever the particular application changes, only plug-in 404 plus the related metadata 400 need be modified or replaced. It should be noted that plug-in 404, in one embodiment, is excluded. In this embodiment, the application specific modules are integrated into in-memory engine 304 or elsewhere.

Plug-in 404 puts the particular overall problem (e.g., business problem), which the user (or an application programmer) defines, into a mathematical formulation or model, which a generic algorithms module 408 (solver) then solves. As used herein, "solver" refers to one or any combination of generic algorithms module 408, solver manager 522 and other solvers. Plug-in 404 maps the raw application data from data cache 406 into the mathematical model (e.g., business model). As an example, one variable in the mathematical model represents the time at which manufacturing should start.

Moreover, plug-in 404 interacts with a data cache 406 and an in-memory engine manager 410. In one embodiment, data cache 406, generic algorithms module 408 (or generic solver) and in-memory engine manager 410 comprise in-memory engine 304. Data cache 406 is a component that stores the in-memory data, i.e., the second set of data. Data cache 406 provides an update means, such as a bidirectional synchronization mechanism (indicated by the dashed lines having arrowheads at both ends), coupling database 302 to data cache 406. Data cache 406 is more than just a traditional data cache, in one embodiment. Data cache 406 has the capability to scan/read metadata 400 and application data 402. Data cache 406 also has the capability to update/write to metadata 400 and application data 402. Thus, data can flow from database 302 to data cache 406 and vice versa. In one embodiment, data cache 406 comprises logic and memory. In another embodiment, data cache 406 comprises only logic and is coupled to memory.

In further keeping with some embodiments according to the present invention, the bidirectional synchronization mechanism manages changes in the content of the first set of data present in database 302, as explained further herein. Changes in the first set of data within database 302 flow from database 302 to data cache 406 and are used to update the second set of data within the data cache. In one embodiment, this update happens in a near-real-time fashion. Moreover, solutions flow from data cache 406 to database 302, as discussed further herein. A user, through computer system 306, then accesses solutions from database 302 via an applications server, discussed further herein.

In prior art attempts, discussed herein, the data being processed (the second set of data) was stored in a dedicated database and was not readily available in memory. Moreover, if there was a change to even only a small portion of the first set of data, the second set of data would not reflect these changes unless the entire first set of data was transferred and used to replace the second set of data. This would lead to inaccuracies in the results of the computations being run on the second set of data since the data was not current. Moreover, it was a very time consuming process to make the second set of data current due to the fact that it would take a long time to copy over the entire first set of data, which was usually voluminous.

A solution to this problem is keeping the second set of data current and readily available in memory. This is accomplished by mirroring the first set of data resident in database 302 into data cache 406. When there is a change in data in database 302, this change is almost immediately reflected in data cache 406 by transferring to the data cache only, in one embodiment, the changes that have occurred in the data in database 302 since a previous update. This methodology ensures that the data in data cache 406 is always current. Furthermore, the fact that only the change in the data rather than the entire data set is transferred saves a great deal of time and bandwidth.

These changes in data are transferred to data cache 406 periodically, in one embodiment. In another embodiment, the changes in application data 402 are transferred to data cache 406 after a user initiates a transaction request (discussed further herein).

Generic algorithms module 408 is a generic solver that comprises the common utilities and interface to general-purpose problem independent algorithms used in in-memory engine 304. Examples of such algorithms involve linear programming, mixed integer programming, etc.

In-memory engine manager 410 manages various components and communications within in-memory engine 304. Additionally, in-memory engine manager 410 interfaces with database 302 and, as already mentioned, plug-in 404. In one embodiment, plug-in 404 is the only application specific software and all other software is reusable. In one embodiment, in-memory engine 304 plus plug-in 404 is one executable.

Figure 5:
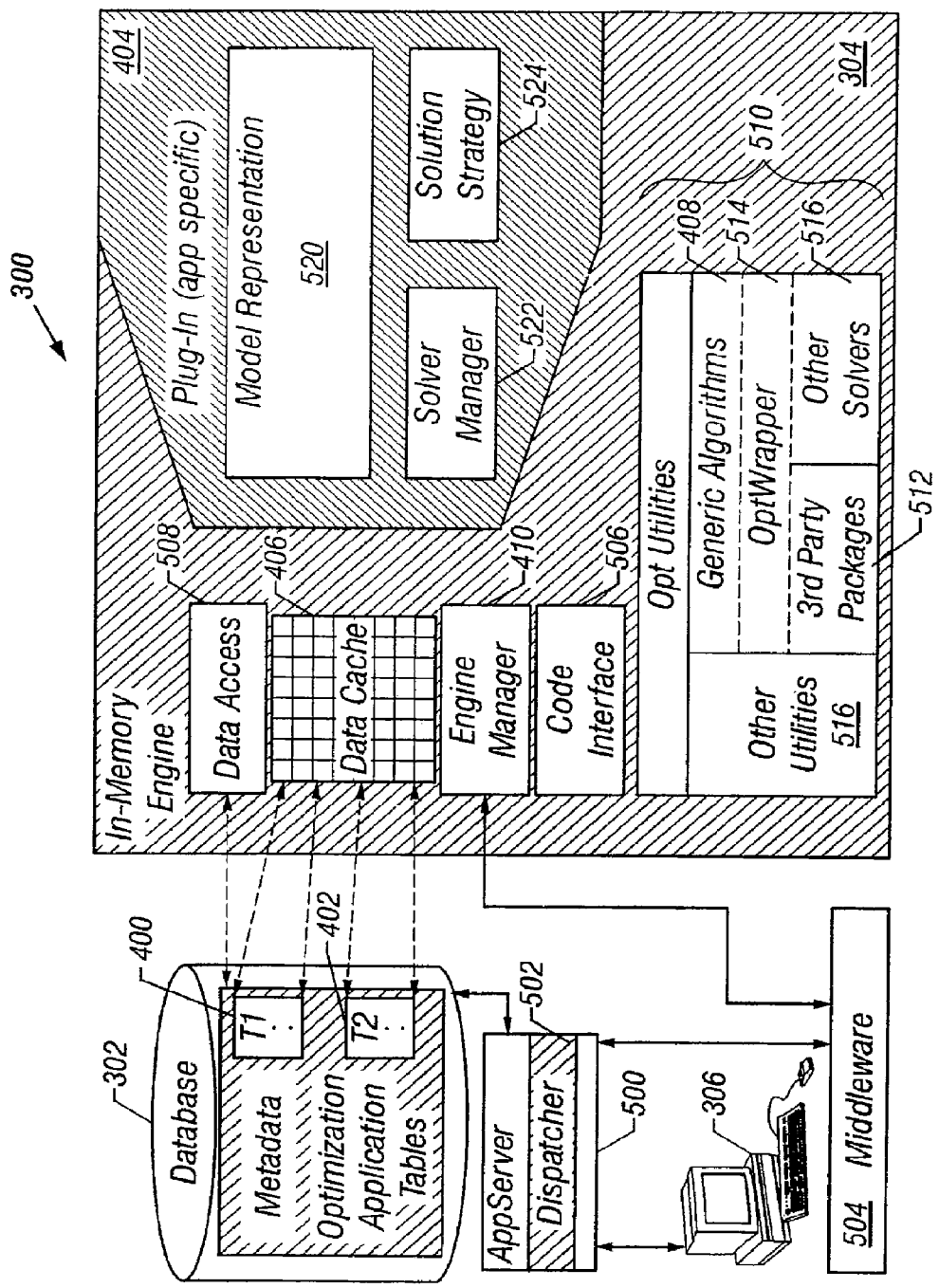
FIG. 5 is the schematic diagram of FIG. 4 in greater detail.

In further keeping with some embodiments according to the present invention, FIG. 5 illustrates one embodiment of FIG. 4 in greater detail. An application server 500 is provided that interfaces with computer system 306. In one embodiment, application server 500 interfaces with a web server (not shown), which in turn interfaces with computer system 306. The user typically interacts with computer system 306 using a browser. Application server 500 includes a dispatcher 502. Dispatcher 502 is an application programming interface (API) that handles the invocation of other modules in system 300. The application server is coupled to database 302 and middleware 504.

Middleware 504 is in turn coupled to in-memory engine manager 410. Middleware 504 manages communication traffic between different server processes, such as between application server 500 and in-memory engine manager 410.

Optional code interface 506 is a part of in-memory engine 304 in one embodiment. Code interface 506 is a language that gives the user the capability to customize the behavior of plug-in 404 without having to rebuild the plug-in. In particular, code interface 506 allows the user to customize a graphical user interface (GUI) of plug-in 404 to suit the particular application.

Another part of in-memory engine 304, a data access module 508, is coupled to database 302 and facilitates communication of the in-memory engine therewith. Specifically, data access module 508 handles communication between database 302 and data cache 406. In one embodiment, a SQL Access Manager (SAM) is the mechanism used by data access module 508 to communicate with database 302.

In one embodiment, also included within in-memory engine 304 are various optimization utilities 510. These optimization utilities include third party packages 512, an optimization wrapper 514, other solvers 516 and other utilities 518. Third party packages 512 are other generic algorithms modules (generic solvers) that can be written or purchased from various vendors and used in place of or in conjunction with generic algorithms module 408. Optimization wrapper 514 is a generic layer wrapper interface. Optimization wrapper 514 provides a generic interface so that various generic algorithms modules from various vendors (or that were self-written) can be used. This module is an interface with plug-in 404. Other solvers 516 are generic algorithms modules that are self-written. Other solvers 516 can be used as alternatives to or in conjunction with third party packages 512. Each third party package 512 and other solver 516 has an optimization wrapper 514 associated therewith. Other utilities 518 comprise utilities that are used frequently enough to include in order to avoid having to build them from scratch. An example is a program to compute a histogram.

It is noteworthy that plug-in 404 can contain various modules as well. Some typical examples are a model representation module 520, a solver manager 522 and a solution strategy module 524.

Model representation module 520 is an application specific module that contains information related to the specific application. In other words, the model representation module contains a mathematical model of the specific real world scenario being analyzed.

Solver manager 522 orchestrates the flow of certain information. For example, solver manager 522 passes output from generic algorithms module 408 to plug-in 404. Solver manager 522 also routes various requests. Solver manager 522 takes results from generic algorithms module 408 and interprets them, placing the result into data cache 406. For example, if $X_1$ equals 5, the solver manager might interpret this to mean that Project 1 should be staffed with five consultants.

Solution strategy module 524 orchestrates at a higher level how to solve the overall problem. Solution strategy module 524 invokes generic solvers, e.g., Solver X and subsequently Solver Y, in order to refine the solution. Solution strategy module 524 is basically a control mechanism for how to combine the capability of the generic solvers.

In operation according to one embodiment, a user desires to use system 300 to solve a particular overall business problem as discussed herein. Initially, the user would store the pertinent data in database 302. As discussed, this data includes information related to inventory, suppliers, BOMs, etc. At the outset, using computer system 306 (or some other means of data entry) and a GUI, the user also defines the overall problem to be solved, which is stored in database 302 in one embodiment. The user decides what criteria (e.g., cost, service quality, etc.) are of most and least importance at this time. The user also decides what parameters should be solved for.

The user enters business criteria stating that profit is of number one concern, customer service is of number two concern, and utilizing resources as desired is of number three concern, in one example. Database 302 (and now data cache 406) is already populated (or is manually populated) with pertinent data needed to solve the overall problem. As discussed herein, this data typically changes over time as new sales orders come in, inventory is depleted, etc.

Figure 6:
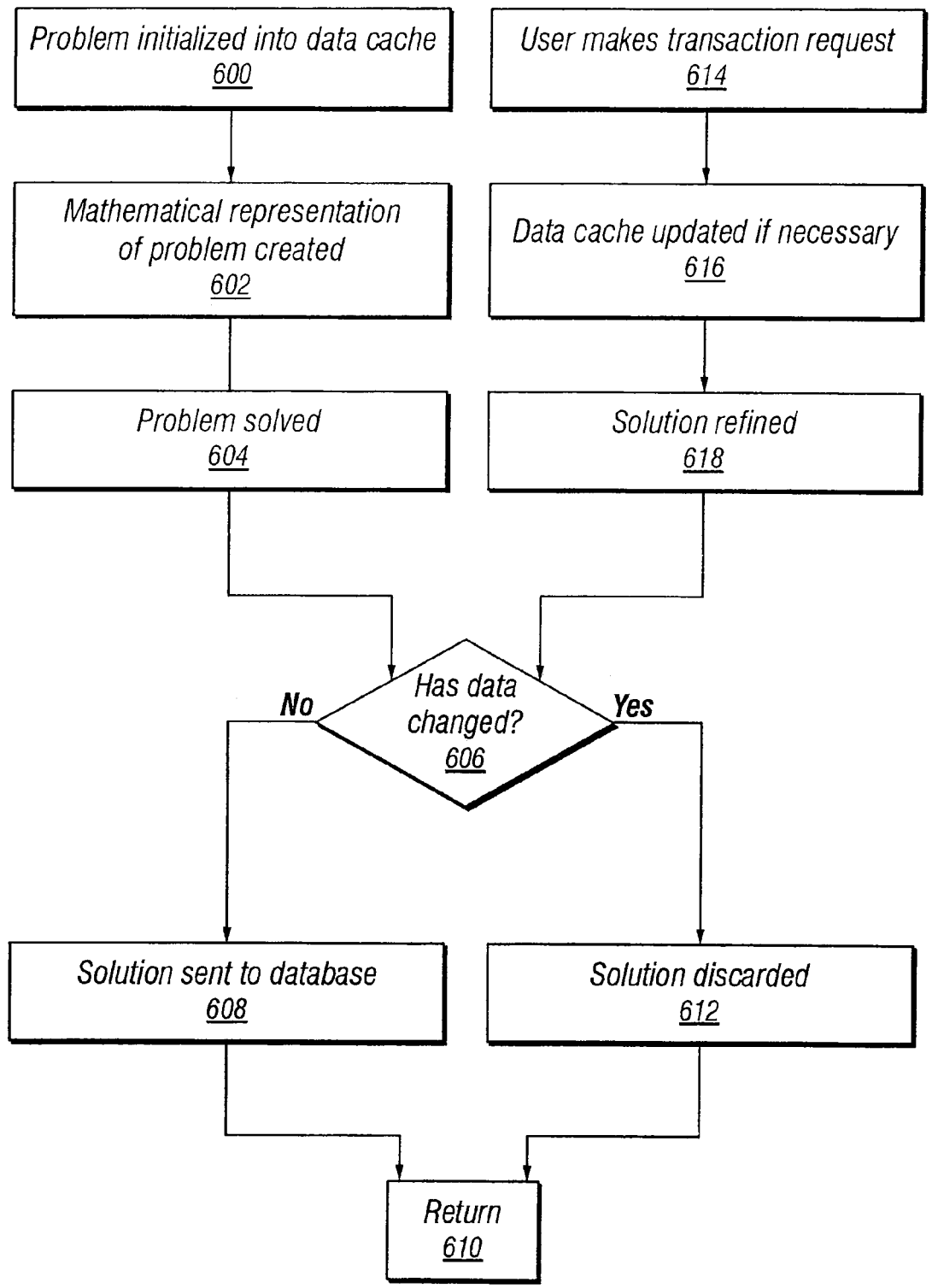
FIG. 6 is a flowchart of a method according to one embodiment of the present invention.

Referring to FIG. 6, at step 600, the user instructs that the overall problem (overall problem instance), which was previously defined and stored as data in database 302, be initialized from database 302 into data cache 406 using computer system 306 and dispatcher 502. The overall problem instance comprises the relevant information that is necessary to solve a particular business problem. One example of an overall problem instance, in the supply chain planning context, includes that customer XYZ requires 100 of item P001 on Jan. 20, 2002, and 3000 of item P020 on Feb. 15, 2002, etc. Furthermore, building one P001 item requires five P002 items, two P003 items, etc. With this and other information, the user may want a production plan that minimizes the total cost.

Consequently, the data representing the overall problem is loaded from database 302 into data cache 406. Importantly, all of the pertinent data is now readily available in data cache 406. This availability of all of the pertinent data in data cache 406 facilitates rapid computations. In one embodiment, all of the data from database 302 is loaded into data cache 406. In another embodiment, substantially all of the data from database 302 is loaded into data cache 406. "Substantially all of the data," as used herein, refers to a significant portion of the data but not necessarily incidental data such as data related to overhead, data dependent upon the hardware that the application is running on, etc.

At step 602, solution strategy module 524 creates a mathematical representation of the overall problem. The creation may include one or more mathematical representations that may be used in conjunction with one or more generic solvers. Plug-in 404 creates a model representation module 520 where the mathematical representation of the overall problem is located. Model representation module 520 is created using the data representing the overall problem that was defined by the user and other data already now resident in data cache 406. Mathematical models now represent much of the overall problem and data.

Figure 7:
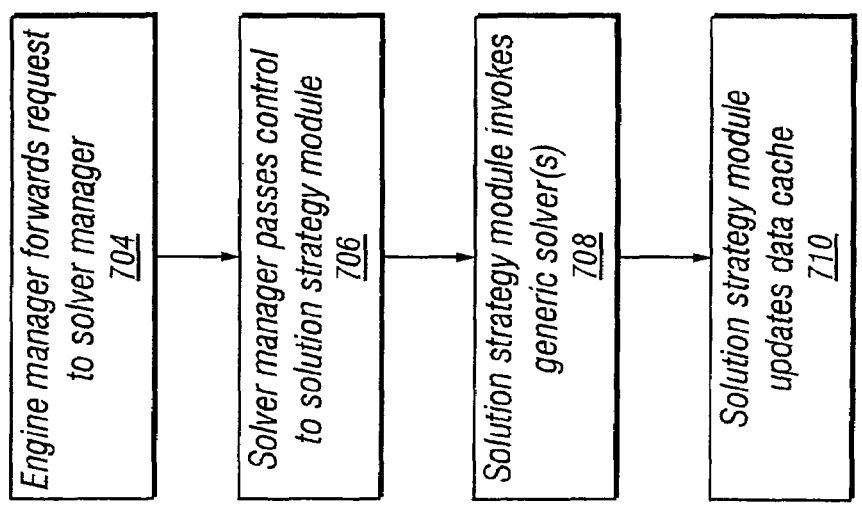
FIG. 7 is a flowchart showing one of the method steps of FIG. 6 in further detail.

At step 604, in-memory engine 304 and plug-in 404 solve the overall problem, as will be shown with reference to FIG. 7.

FIG. 7 shows sub steps of step 604 (and step 618 mentioned herein). Referring to FIG. 7, at step 704, in-memory engine 304 and plug-in 404 use the modules contained within each in order to derive a solution. At step 704, engine manager 410 forwards a request to solver manager 522. Solver manager 522 has information that data cache 406 is current since the problem data was just loaded into the data cache. Model representation module 520 has also been updated if there was any change in data. One exemplary method of updating model representation module 520 is a callback mechanism. This means that model representation module 520 registers with data cache 406 so that the model representation module is automatically updated whenever data cache 406 is updated. Whenever data cache 406 is updated, the data cache calls a function that informs model representation module 520 that the model representation module may need an update.

At step 706, solver manager 522 passes control to solution strategy module 524. Solution strategy module 524 contains information about how to solve the overall problem using various generic solvers such as generic algorithms module 408.

At step 708, solution strategy module 524 thus invokes the appropriate generic solver(s) and reads from and writes to model representation module 520, accordingly, in order to produce data representing a solution to the overall problem the user is trying to solve. Then, solver manager 522 interprets this data to determine a solution that is meaningful to the user. At step 710, solution strategy module 524 updates data cache 406 with the solution to the overall problem the user is trying to solve. Subsequently, control passes back to solver manager 522, and then to in-memory engine manager 410.

Referring again to FIG. 6, at step 606, if application data 402 has not changed during the solving of the overall problem, then at step 608, the data representing the solution is loaded from data cache 406 into database 302, via the bidirectional mechanism (through data access module 508), and is accessed by the user. The user accesses the solution via application server 500 and computer system 306. At step 610, the process returns to either step 600 or step 614 depending on the instructions of the user.

If, at step 606, application data 402 has changed during the solving of the overall problem, then at step 612, the solution is discarded, the user is informed and the process proceeds to step 610. However, the user can decide to override the discarding of the problem.

With reference to step 606, it should be noted that some of the data in database 302 could change in various ways. For example, the user can change data in database 302. Other examples of the changes that typically occur in the data in database 302 include new sales orders coming in, depletion of raw materials, etc.

As previously mentioned, as data within database 302 changes, the changes are reflected in data cache 406. If the user instructs, at step 610, to make a transaction request, the process proceeds to step 614. The user may change or modify the overall problem to be solved, or other data may have been modified, in database 402. For example, the user may now wish to generate a production plan that maximizes customer satisfaction (e.g., shipping on time is the top priority).

This user request will automatically cause a synchronization to occur. Thus, the user transaction enters engine manager 410 and the process proceeds to step 616. At step 616, engine manager 410 instructs data cache 406 to synchronize with database 302. Performing synchronization at this point is desirable because even though data from database 302 may have recently been copied to data cache 406, the data in database 302 can be in a continual state of flux and may have changed since the last synchronization. Performing a synchronization means that data cache 406 will be updated, if necessary, to mirror metadata 400 and application data 402 in database 302. This synchronization is performed with the assistance of the bidirectional mechanism shown by the dashed lines with arrowheads at both ends. Data cache 406 scans through the rows of data in the metadata arrays, via data access module 508, and determines if any rows indicate a change since the last synchronization (or, in this case, since the data from database 302 was loaded into data cache 406). In order to make this check, flags within metadata 400 are examined. These flags indicate the last occurrence of updates for various parts (e.g., rows) of metadata 400 tables. The update flags are compared against flags from the last update of data cache 406. This check will be made at the initiation of a user request.

Still referring to step 616, the data that has changed, if any, is then loaded from database 302 into data cache 406 via the bidirectional mechanism (through data access module 508). In one embodiment, only the data in database 302 that has changed is loaded from database 302 into data cache 406. In another embodiment, substantially no more than the data in database 302 that has changed is loaded from database 302 into data cache 406. For example, database 302 holds 1 gigabyte of data and only 1 kilobyte of data has changed. Only (or substantially only) the 1-kilobyte of changed data is loaded from database 302 into data cache 406. Consequently, the current data in database 302 is resident in in-memory engine 304 and can be accessed quickly to rapidly perform memory intensive computations.

This process is much more efficient than copying over an entire database periodically or each time a data update is desired. Control is then passed back to engine manager 410.

At step 618, in-memory engine 304 and plug-in 404 refine the solution, as discussed with reference to step 604, after the update of step 616. Refining the solution, as used herein, refers to solving the overall problem as before, albeit using an updated set of data. Accordingly, new results, if different than the previous results, are immediately transferred from data cache 406 to computer system 306 via database 302 and application server 500. The process then proceeds to step 606 and beyond, as described herein.

As can be seen from FIG. 6, this process of the first set of data within database 302 changing, the second set of data in data cache 406 changing, and the solution to the overall problem being updated (if different than the previous solution) when the user makes a transaction request, is an ongoing process. As mentioned herein, the data in data cache 406 is updated in a near-real-time fashion due to the synchronization made at the onset of user requests to see if the data in database 302 has changed since the last update. As described herein, it is noteworthy that consistency of data is maintained in two ways. First, changes in the first set of data are used to update the second set of data. Second, when the data representing the solution to the overall problem changes, data cache 406 sends this changed data to database 302.

In one embodiment, a module is included in in-memory engine 304 and referred to herein as "model representation base classes." This module contains a set of base classes used to create the business model inside model representation module 520 of plug-in 404. A primary goal of these base classes is to provide structure to the plug-in 404 implementation without sacrificing flexibility. A secondary goal is to provide the plug-in 404 with an interface to data cache 406.

The model representation base classes allow plug-in 404 to register for data cache 406 changes, look up data in data cache 406, and make changes to the data in data cache 406. Additionally, the model representation base classes provide a mechanism to pass messages between objects in model representation module 520 in order to maintain overall model integrity. For example, if a customer order object is deleted, other objects related to the supply chain plan for that customer order need to deleted or adjusted. This change notification occurs by sending a delete message from the customer order object to the plan objects that depend on it. This mechanism is built into the base classes so that the plug-in specific tangible classes can take advantage of it in model representation module 520.

Thus, a system 300 has been shown and described that exhibits an efficient mechanism to handle near-real-time bidirectional synchronization between a database and an application. System 300 continuously and efficiently updates data resident in memory a near-real-time fashion. System 300 computes a solution that changes when the data resident in memory is updated. It should be noted that, unlike in the prior art, a separate GUI does not need to be created for each specific application. There is one GUI that is a part of system 300 that is independent of the various plug-ins 404 that can be used.

Figure 8:
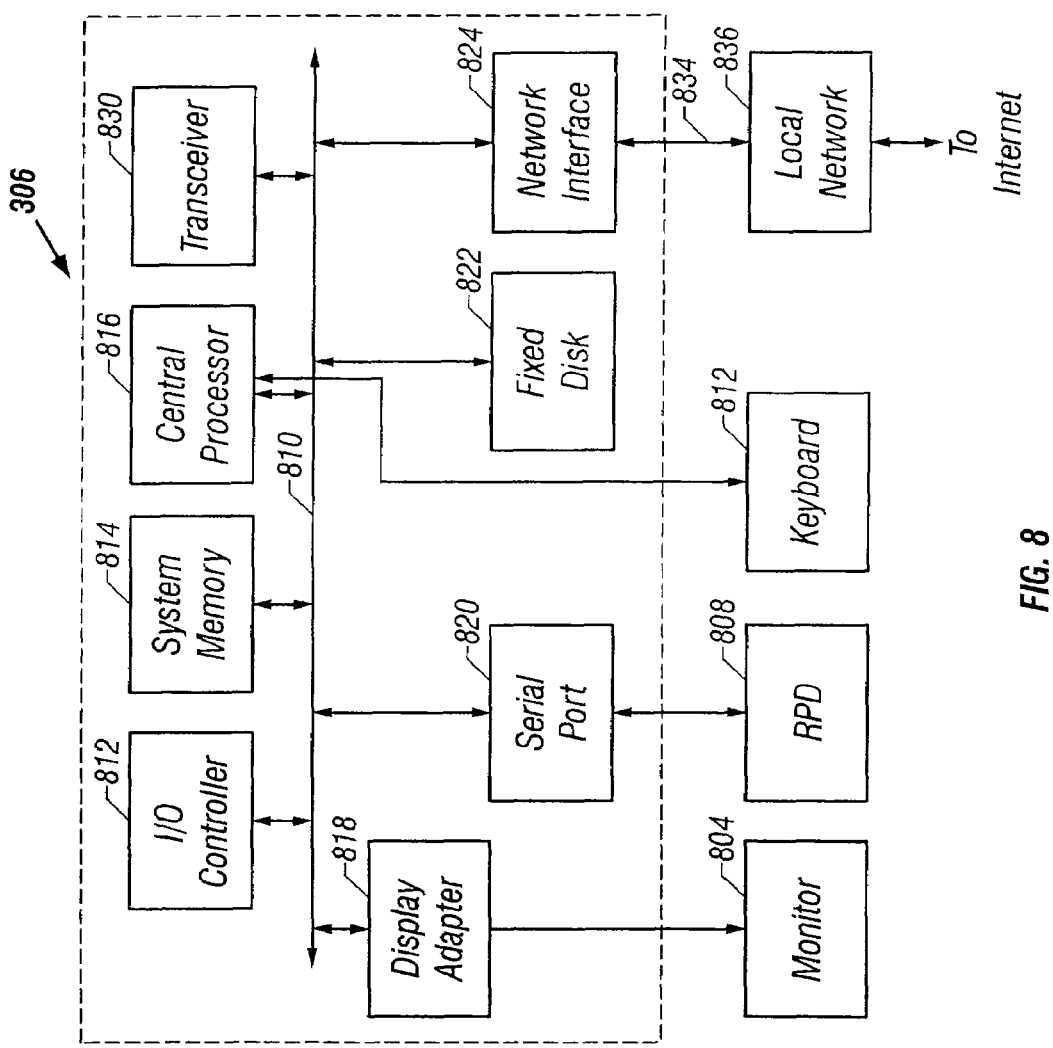
FIG. 8 illustrates subsystems of an exemplary computer system for use with the present invention.

FIG. 8 illustrates subsystems found in one exemplary computer system, such as computer system 306, that can be used in accordance with embodiments of the present invention. Computers can be configured with many different hardware components and can be made in many dimensions and styles (e.g., laptop, palmtop, server, workstation and mainframe). Thus, any hardware platform suitable for performing the processing described herein is suitable for use with the present invention.

Subsystems within computer system 306 are directly interfaced to an internal bus 810. The subsystems include an input/output (I/O) controller 812, a system random access memory (RAM) 814, a central processing unit (CPU) 816, a display adapter 818, a serial port 820, a fixed disk 822 and a network interface adapter 824. The use of the bus allows each of the subsystems to transfer data among the subsystems and, most importantly, with CPU 816 subsystem. External devices can communicate with CPU 816 or other subsystems via bus 810 by interfacing with a subsystem on the bus.

FIG. 8 is merely illustrative of one suitable configuration for providing a system in accordance with the present invention. Subsystems, components or devices other than those shown in FIG. 8 can be added without deviating from the scope of the invention. A suitable computer system can also be achieved without using all of the subsystems shown in FIG. 8. Other subsystems such as a CD-ROM drive, graphics accelerator, etc., can be included in the configuration without affecting the performance of computer system 306.

One embodiment according to the present invention is related to the use of an apparatus, such as computer system 306, for implementing a system according to embodiments of the present invention. CPU 816 can execute one or more sequences of one or more instructions contained in system RAM 814. Such instructions may be read into system RAM 814 from a computer-readable medium, such as fixed disk 822. Execution of the sequences of instructions contained in system RAM 814 causes the processor to perform process steps, such as the process steps described herein. One or more processors in a multi-processing arrangement may also be employed to execute the sequences of instructions contained in the memory. In alternative embodiments, hard-wired circuitry may be used in place of or in combination with software instructions to implement the invention. Thus, embodiments of the invention are not limited to any specific combination of hardware circuitry and software.

The terms "computer-readable medium" and "computer-readable media" as used herein refer to any medium or media that participate in providing instructions to CPU 816 for execution. Such media can take many forms, including, but not limited to, non-volatile media, volatile media and transmission media. Non-volatile media include, for example, optical or magnetic disks, such as fixed disk 822. Volatile media include dynamic memory, such as system RAM 814. Transmission media include coaxial cables, copper wire and fiber optics, among others, including the wires that comprise one embodiment of bus 810. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, punch cards, paper tape, any other physical medium with patterns of marks or holes, a RAM, a PROM, an EPROM, a FLASHEPROM, any other memory chip or cartridge, a carrier wave, or any other medium from which a computer can read.

Various forms of computer-readable media may be involved in carrying one or more sequences of one or more instructions to CPU 816 for execution. Bus 810 carries the data to system RAM 814, from which CPU 816 retrieves and executes the instructions. The instructions received by system RAM 814 can optionally be stored on fixed disk 822 either before or after execution by CPU 816.

Many subsystem configurations are possible. FIG. 8 is illustrative of but one suitable configuration. Subsystems, components or devices other than those shown in FIG. 8 can be added. A suitable computer system can be achieved without using all of the subsystems shown in FIG. 8.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A system for efficiently performing memory intensive computations, the system comprising:
   a data cache located operable to perform a scan operation on at least a portion of a first set of data stored in a database and perform a first update operation on a second set of data stored in memory when changes occur in the first set of data;
   an engine manager operable to instruct the data cache to perform the first update operation, the engine manager being further operable to determine subsequent changes in the first set of data and perform additional update operations on the second set of data; and
   a solver operable to perform at least one computation using the second set of data stored in memory to determine a first solution, the solver being further operable to re-perform the at least one computation using the updated second set of data stored in memory when the second update occurs during performance of the at least one computation, the re-performance causing the first solution to be discarded without first being transmitted to the first data set.

2. The system of claim 1, further comprising an application specific plug-in coupled to the solver and configured to direct the solver to perform the computations on the second set of data.

3. The system of claim 1, wherein the system is configured to update the second set of data with substantially no more than the changes to the first set of data.

4. The system of claim 1, wherein the system is configured to update the second set of data with changes to the first set of data in a near-real-time fashion.

5. The system of claim 1, wherein the system is configured to update the second set of data with substantially no more than the changes to the first set of data that meet a given condition.

6. The system of claim 1, wherein the data cache is coupled to the first set of data and the second set of data in a bidirectional fashion.

7. The system of claim 1, wherein the first set of data comprises metadata and application data.

8. The system of claim 1, wherein the solver comprises a generic algorithms module.

9. The system of claim 1, wherein the computations solve problems encountered in business applications.

10. A method in a computer system for efficiently performing memory intensive computations, the method comprising the steps of:
    performing a first update operation on a second data set stored in system memory to reflect changes that have occurred in a first data set stored in a database;
    performing at least one computation using the second data set to determine a first solution; and
    re-performing the at least one computation using the updated second data set to determine a second solution when the first update operation occurs during performance of the at least one computation, in order to include the changes to the first data set in the production of the second solution.

11. A method according to claim 10, further comprising:
    discarding the first solution without first transmitting the first solution to the first data set.

12. A method according to claim 10, further comprising:
    determining whether the first data set has changed since the first update operation.

13. A method according to claim 10, wherein:
    said determining step includes performing a scan operation on at least a portion of the first data set.

14. A method according to claim 10, further comprising:
    instructing a data cache to perform the second update operation upon determination that the first data set has changed since the first update operation.

15. A system for efficiently performing memory intensive computations, the system comprising:
    a data caching module operable to perform a first update operation on a second data set stored in system memory with any changes that have occurred in a first data set stored in a database; and
    a computation module operable to perform at least one computation using the second set of data to determine a first solution, the computation module being further operable to discard the first solution and re-perform the at least one computation using the updated second data set stored in memory to determine a second solution when the first update to the second data set occurs during performance of the at least one computation.

16. A computer program product embedded in a computer readable medium for efficiently performing memory intensive computations, comprising:

program code for performing a first update operation on a second data set stored in system memory to reflect changes that have occurred in a first data set stored in a database;

program code for performing at least one computation using the second data set to determine a first solution; and program code for re-performing the at least one computation using the updated second data set to determine a second solution when the first update operation occurs during performance of the at least one computation, in order to include the changes to the first data set in the production of the second solution.

17. A computer program product according to claim 16, further comprising:

program code for discarding the first solution without first transmitting the first solution to the first data set in response to the re-performing.

18. A computer program product according to claim 16, further comprising:

program code for determining whether the first data set has changed since the first update operation.

19. A computer program product according to claim 16, wherein:

program code for said determining step includes program code for performing a scan operation on at least a portion of the first data set.

20. A computer program product according to claim 16, further comprising:

program code for instructing a data cache to perform the second update operation upon determination that the first data set has changed since the first update operation.

* * * * *

UNITED STATES PATENT AND TRADEMARK OFFICE
CERTIFICATE OF CORRECTION

PATENT NO. : 7,444,477 B2  
APPLICATION NO. : 11/679040  
DATED : October 28, 2008  
INVENTOR(S) : Yang et al.

It is certified that error appears in the above-identified patent and that said Letters Patent is hereby corrected as shown below:

In column 12, line 44, in Claim 11, delete "transmiffing" and insert -- transmitting --, therefor.

In column 14, line 4, in Claim 17, delete "transmiffing" and insert -- transmitting --, therefor.

Signed and Sealed this

Twenty-seventh Day of April, 2010

David J. Kappos  
*Director of the United States Patent and Trademark Office*